United States Patent
Tun et al.

(10) Patent No.: US 8,970,548 B2
(45) Date of Patent: Mar. 3, 2015

(54) TOUCH DISPLAY AND METHOD FOR DRIVING TOUCH DISPLAY

(71) Applicant: AU Optronics Corp., Hsin-Chu (TW)

(72) Inventors: Kyaw Kyaw Tun, Hsin-Chu (TW);
Chao-Chen Wang, Hsin-Chu (TW);
Chi-Cheng Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 125 days.

(21) Appl. No.: 13/802,611

(22) Filed: Mar. 13, 2013

(65) Prior Publication Data
US 2013/0300706 A1    Nov. 14, 2013

(30) Foreign Application Priority Data
May 14, 2012   (TW) ............... 101117065 A

(51) Int. Cl.
*G06F 3/045*   (2006.01)
*G06F 3/044*   (2006.01)
*G06F 3/041*   (2006.01)

(52) U.S. Cl.
CPC .............. *G06F 3/044* (2013.01); *G06F 3/0412* (2013.01); *G06F 3/0418* (2013.01)

USPC ............ 345/174; 345/173; 345/103; 345/204

(58) Field of Classification Search
None
See application file for complete search history.

(56) References Cited

U.S. PATENT DOCUMENTS

| 2010/0182273 | A1 | 7/2010 | Noguchi |
| 2010/0295824 | A1 | 11/2010 | Noguchi |
| 2011/0025635 | A1* | 2/2011 | Lee ............................... 345/173 |

FOREIGN PATENT DOCUMENTS

CN    101893957    11/2010

* cited by examiner

*Primary Examiner* — Muhammad N Edun
(74) *Attorney, Agent, or Firm* — Winston Hsu; Scott Margo

(57) ABSTRACT

A touch display includes a display panel, a plurality of sensing electrodes and a driving circuit module. The display panel includes a plurality of pixels. The plurality of sensing electrodes are stacked with the display panel and are used for detecting a touch input and generating a sensing signal in response to the touch input. The driving circuit module is electrically coupled to the display panel and the plurality of sensing electrodes, for controlling the pixels of the display panel according to an image data, and generating a touch signal for indicating whether the touch display is touched or not in response to the image data and the sensing signal.

20 Claims, 14 Drawing Sheets

| Updated sensing capacitances | | | | |
|---|---|---|---|---|
| c(0,3) | c(1,3) | c(2,3) | c(3,3) | c(4,3) |
| c(0,2) | c(1,2) | c(2,2) | c(3,2) | c(4,2) |
| c(0,1) | c(1,1) | c(2,1) | c(3,1) | c(4,1) |
| c(0,0) | c(1,0) | c(2,0) | c(3,0) | c(4,0) |

=

| Correction capacitances | | | | |
|---|---|---|---|---|
| b(0,3) | b(1,3) | b(2,3) | b(3,3) | b(4,3) |
| b(0,2) | b(1,2) | b(2,2) | b(3,2) | b(4,2) |
| b(0,1) | b(1,1) | b(2,1) | b(3,1) | b(4,1) |
| b(0,0) | b(1,0) | b(2,0) | b(3,0) | b(4,0) |

−

| Second capacitances | | | | |
|---|---|---|---|---|
| a(0,3) | a(1,3) | a(2,3) | a(3,3) | a(4,3) |
| a(0,2) | a(1,2) | a(2,2) | a(3,2) | a(4,2) |
| a(0,1) | a(1,1) | a(2,1) | a(3,1) | a(4,1) |
| a(0,0) | a(1,0) | a(2,0) | a(3,0) | a(4,0) |

FIG. 5

TOUCH DISPLAY AND METHOD FOR DRIVING TOUCH DISPLAY

BACKGROUND

1. Technical Field

The present invention relates to a display, especially relating to a touch display capable of sensing positions touch by users.

2. Description of the Prior Art

Due to their slim shapes, low power dissipation and low radiation, liquid crystal displays (LCDs) are widely applied in mobile electronic devices such as notebooks, monitors, and PDAs (personal digital assistants). Liquid crystal displays having touch input functions are also widely applied on more and more electronic devices as input interfaces.

Capacitive touch displays are used to determine the touched positions of users according to the capacitance generated via touch. However, some substantial valid capacitances are generated from the displayed images with various grey levels instead of being generated by touch. This causes the capacitive touch displays to incorrectly judge the touched positions, thus reducing the accuracy and fluency of performing touch input. Besides, different grey levels may generate different valid capacitances. With the improving resolution of the displays, the accuracy and fluency of performing touch input becomes more and more important.

SUMMARY

An embodiment of the present invention provides a touch display. The touch display includes a display panel, a plurality of sensing electrodes and a driving circuit module. The display panel includes a plurality of pixels. The plurality of sensing electrodes are stacked with the display panel and are used for detecting a touch input and generating a sensing signal in response to the touch input. The driving circuit module is electrically coupled to the display panel and the plurality of sensing electrodes, for controlling the pixels of the display panel according to an image data, and generating a touch signal for indicating whether the touch display is touched or not in response to the image data and the sensing signal.

Another embodiment of the present invention provides a touch display comprising a display panel including a plurality of pixels; a plurality of sensing electrodes stacked with the display panel for detecting a touch input and generating a sensing signal in response to the touch input; and a driving circuit module electrically coupled to the display panel and the plurality of sensing electrodes, for controlling the pixels of the display panel, and generating a touch signal for indicating whether the touch display is touched or not in response to capacitances of a liquid crystal layer of a portion or all of the pixels and the sensing signal.

Another embodiment of the present invention provides a method for driving a touch display. The touch display comprises a display panel, a plurality of first electrodes and a plurality of second electrodes, the display panel comprising a plurality of pixels. The method comprises receiving an image data, controlling gray levels of the pixels of the touch display according to the image data, receiving a sensing signal in response a touch input from the first electrodes, and generating a touch signal for indicating whether the touch display is touched or not according to the sensing signal and the image data.

Through utilizing the devices and methods provided in the embodiments of the present invention, the touch displays will not misjudge the positions touched by users due to the equivalent capacitance caused by the image data, thus improving the accuracy and fluency of operating the touch displays.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 shows the touch display generating the touch signal according to a plurality of sub-sensing values and correction values corresponding to each sensing point.

DETAILED DESCRIPTION

Figure 1A:
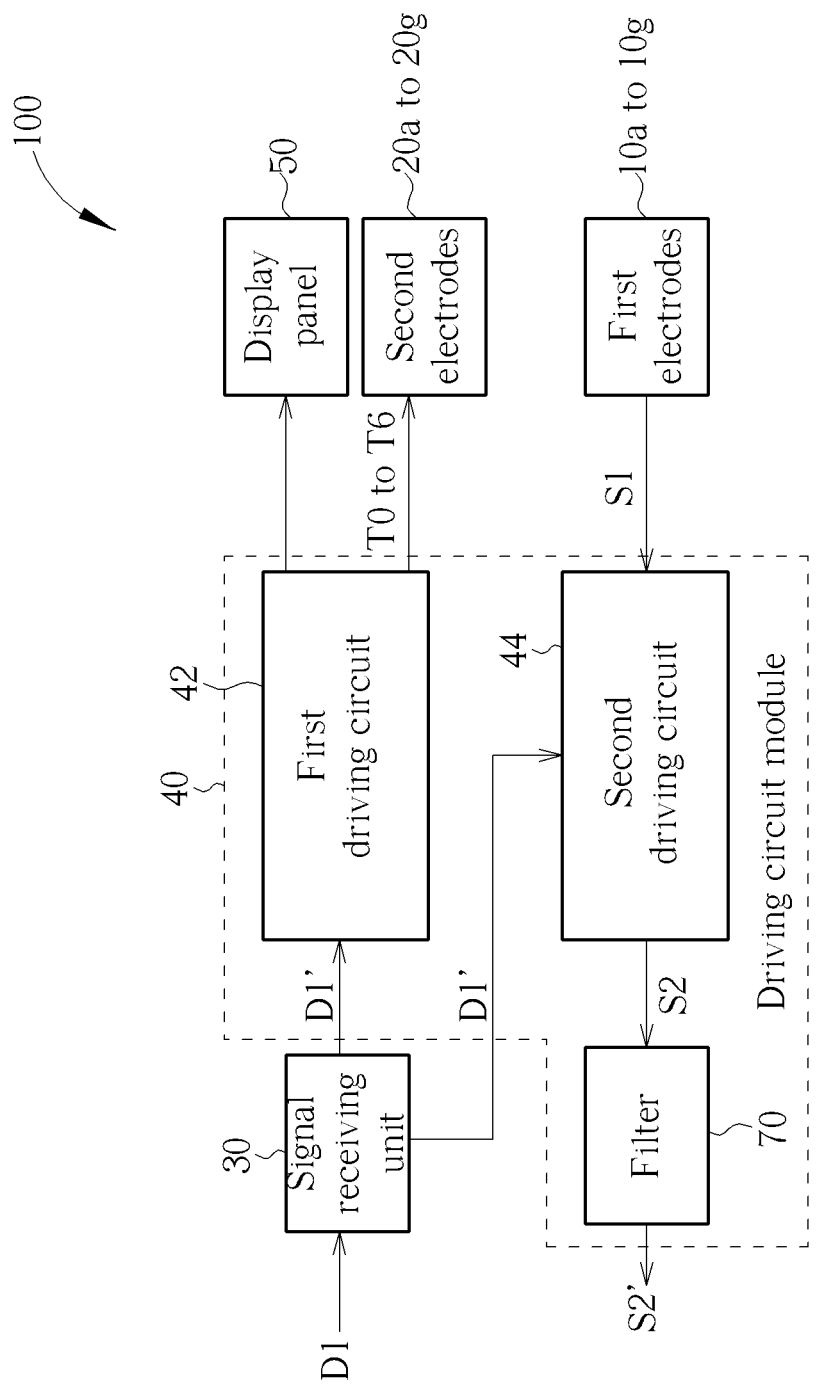
FIG. 1A shows the system architecture of the touch display according to a first embodiment of the present invention.

The detailed descriptions of the present invention are exemplified below in examples. However, the examples are merely used to illustrate the present invention, not to limit the present invention. Because one skilled in the art may modify the present invention or combine the present invention with some features within the scope of the present invention, the claimed scope of the present invention should be referred to in the following claims.

In the entire specification and claims, unless the contents clearly specify the meaning of some terms, the terms "a" or "the" may refer to one or at least one of elements or components. Besides, in the present disclosure, unless it can be clearly seen from the relating context that the examples or embodiments do not refer to multiple elements or components, singular articles may refer to one or at least one of elements or components. The meanings of every term used in the present claims and specification refer to a usual meaning known to one skilled in the art unless the meaning is additionally annotated. Some terms used to describe the present invention will be discussed to guide practitioners about the present invention. Every example in the present specification can not limit the claimed scope of the present invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range. For example, if it is described that the length of a component is X cm to Y cm, then it is equivalent to sentence "the length of the component is H, and H can be any real number values between the values of X and Y."

Further, in the present specification and claims, the term "comprising" is open type and should not be viewed as the term "consisted of." Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Furthermore, it can be understood that the terms "comprising," "including," "having," "containing," and "involving" are open-ended terms, which refer to "may include but is not limited to so." Besides, each of the embodiments or claims of the present invention is not necessary to achieve all the effects and advantages possibly to be generated, and the abstract and title of the present invention is used to assist for patent search and is not used to further limit the claimed scope of the present invention.

The embodiments and figures are provided as follows in order to illustrate the present invention in detail, but please notice that the claimed scope of the present invention is not limited by the provided embodiments and figures.

Figure 2:
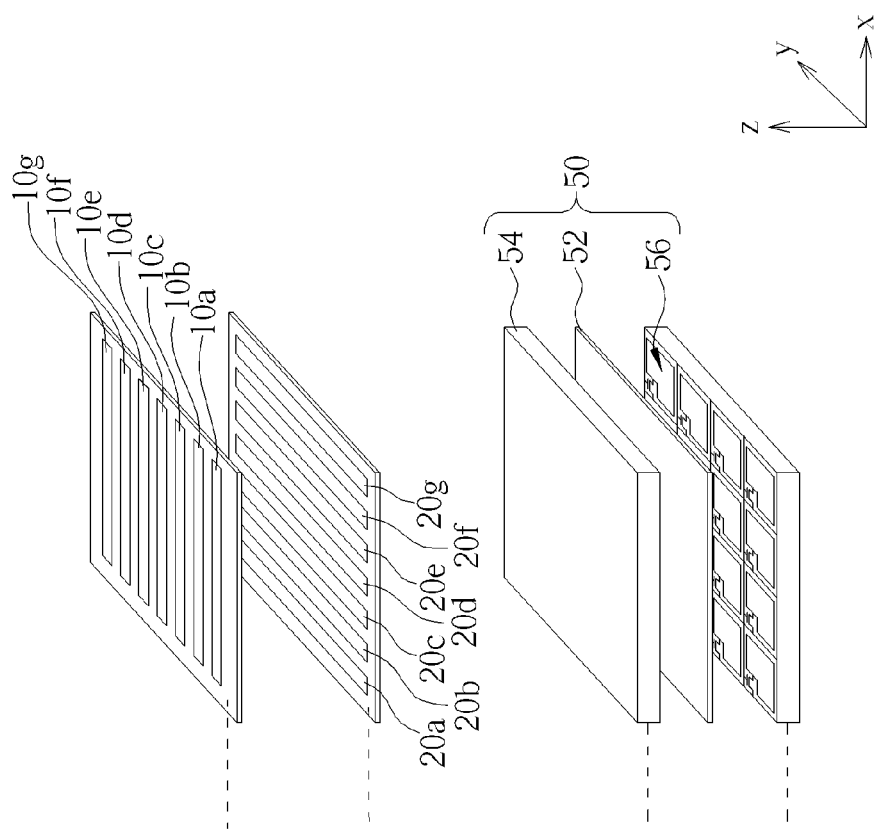
FIG. 2 shows the structure of display, first electrodes and second electrodes of the present invention.

Please refer to FIGS. 1A and 2. FIG. 1A shows the system architecture of the touch display 100 according to a first embodiment of the present invention. FIG. 2 shows the structure of display 50, first electrodes 10a to 10g and second electrodes 20a to 20g of the present invention. As shown in FIGS. 1A and 2, the touch display 100 includes a display panel 50, a plurality of first electrodes 10a to 10g arranged along the x axis, a plurality of second electrodes 20a to 20g arranged along the y axis, a signal receiving unit 30, driving circuit module 40 and a filter 70.

The display panel 50 includes a liquid crystal layer 52, a common electrode 54 and a plurality of pixel electrodes 56. The common electrode 54 and the pixel electrodes 56 can be respectively configured at the opposite sides of the liquid crystal layer 52, or can be disposed at the same side of the liquid crystal layer 52. The common electrode 54 and the pixel electrodes 56 can be used to drive the liquid crystal layer 52 to change the arrangement of the liquid crystal molecules to modify the polarizing direction of the light passing through the liquid crystal molecular. The first electrodes 10a to 10g are used to output a sensing signal S1, and the second electrodes 20a to 20g are used to sequentially receive driving pulses T0 to T6. The signal receiving unit 30 is used to receive an image data D1, and the signal receiving unit 30 can be a port of the touch display 100 used to receive the outer signal D1 or be a circuit to receive image data. The signal receiving unit 30 can further output another image data D1'. The image data D1' can be the same signal as the image data D1, or be a signal generated through processing the image data D1. The driving circuit module 40 is coupled to the signal receiving unit 30, the display panel 50, the first electrodes 10a to 10g and second electrodes 20a to 20g, for controlling the voltage differences between the pixel electrodes 56 and the common electrode 54 according to the image data D1 transmitted from the signal receiving unit 30 to control the tilt angle of the liquid crystal molecular of the liquid crystal layer 52 to change the grey level of the pixels of the display panel 50.

The driving circuit module 40 is also used for sequentially providing driving pulses T6 to T0 to the second electrodes 20a to 20g, receiving the sensing signal S1 transmitted from the first electrodes 10a to 10g, and generating the touch signal S2 according to the sensing signal S1 and the image data D1. The filter 70 is used to filter the touch signal S2 to generate a modified touch signal S2'. The driving circuit module 50 may further include an operating unit to process the received signals.

The touch signal S2 can be equivalent mutual capacitance generated by substantially (or essentially) touching the touch display 100, be a signal corresponding to the equivalent mutual capacitance, or be a signal corresponding to the sensing result of the first electrodes. Besides, substantially touching refers directly to physical contact, or refers to non-physical contact but having equivalent effects as performing physical contacts. Thus, through sensing the touch signal S2, the touched positions of the touch display 100 and how the touch display 100 is being touched can be known. Besides, the touch signal comprises a plurality of sub-touch signals. Each sub-touch signal is used for indicating a touch status of a corresponding sensing point at the display panel 50 in response to the touch input, and each sub-touch signal is generated according to gray levels of a portion of the pixels near the corresponding sensing point and the sensing signal.

The driving circuit module 40 includes a first driving circuit 42 and a second driving circuit 44. The first driving circuit 42 is coupled to the display panel 50, the signal receiving unit 30 and the second electrodes 20a to 20g, for controlling voltage differences between each of the pixel electrodes 56 and the common electrode 54 according to the image data D1 received by the signal receiving unit 30, to control the tilt angles of liquid crystal molecules of the liquid crystal layer 52 to change the grey levels of the pixels of the display panel 50, and to sequentially provide the driving pulses T6 to T0 for the second electrodes 20a to 20g.

The second driving circuit 44 is coupled to the signal receiving unit 30 and the first electrodes 10a to 10g, for receiving the sensing signal S1 from the first electrodes 10a to 10g and receiving the image data D1' from the signal receiving unit 30, and generating the touch signal S2 according to the sensing signal S1 and the image data D1. The first electrodes 10a to 10g, the second electrodes 20a to 20g, the first driving circuit 42 and the second driving circuit 44 can be integrated on the same touch panel integrated circuit. Further, the first driving circuit 42 and the second driving circuit 44 and the filter 70 can be integrated on the same integrated circuit digitally or analogy.

Figure 1B:
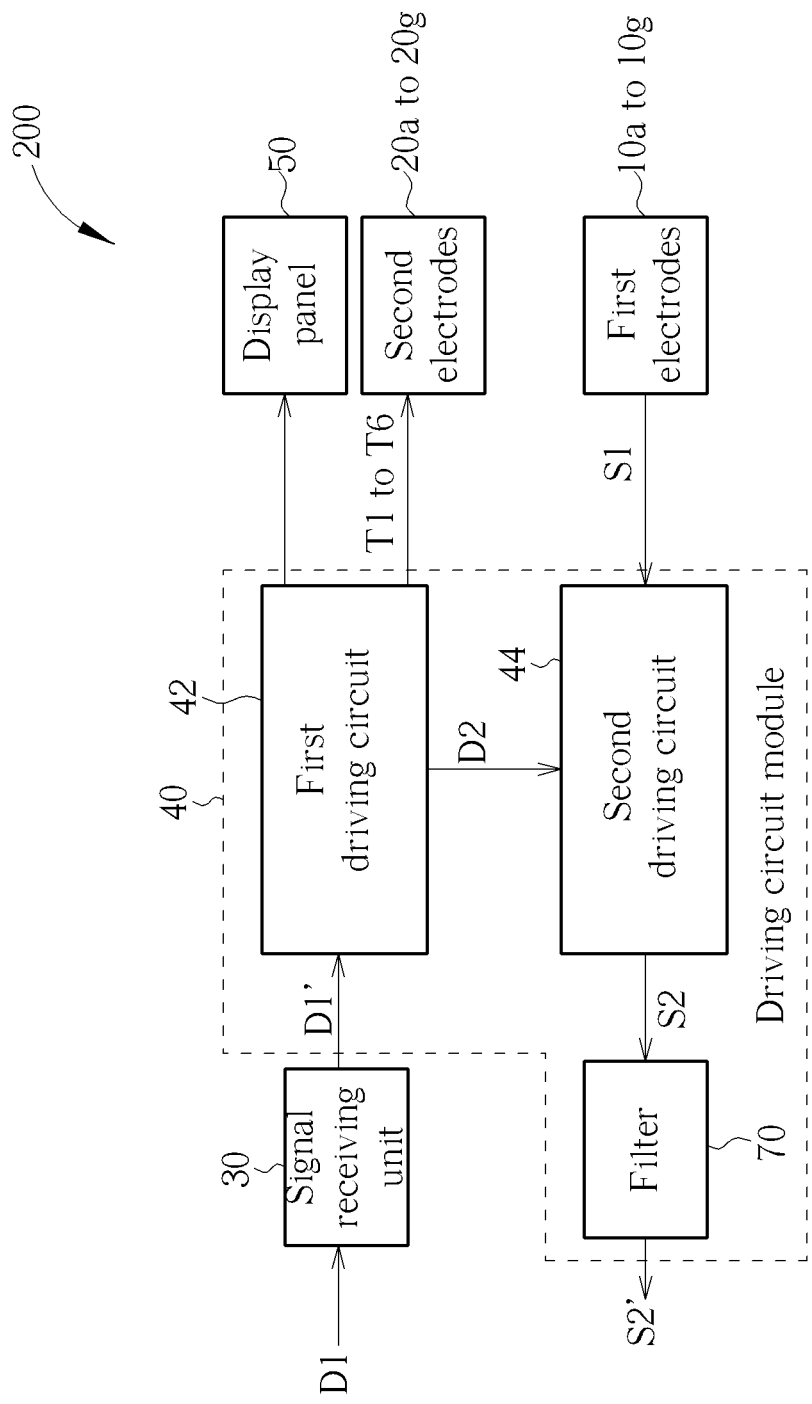
FIG. 1B shows the system structure of a touch display according to a second embodiment of the present invention.

Please refer to FIG. 1B, which shows the system structure of a touch display 200 according to a second embodiment of the present invention. One difference between the touch display 200 and the touch display 100 is that in the touch display 200, the second driving circuit 44 of the driving circuit module 40 is coupled to the first driving unit 42 and the first electrodes 10a to 10g for receiving the sensing signal S1 through the first electrodes 10a to 10g and receiving an adjusting signal D2 corresponding to the image data D1 through the first driving circuit 42. The adjusting signal D2 is generated by the first driving circuit 42 according to the image data D1, and the touch signal S1 is generated according to the sensing signal S1 and the adjusting signal D2.

Figure 1C:
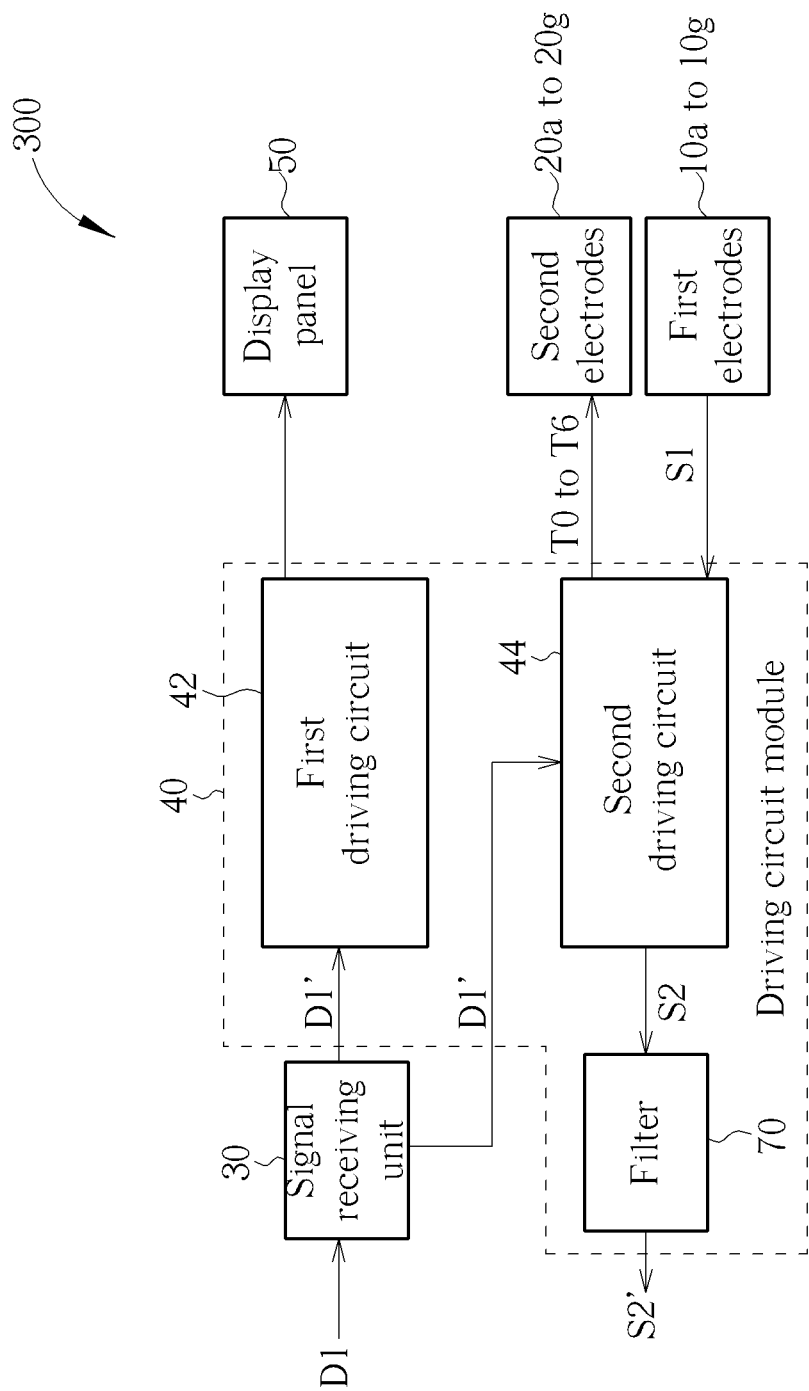
FIG. 1C shows the system structure of a touch display according to a third embodiment of the present invention.

Please refer to FIG. 1C, which shows the system structure of a touch display 300 according to a third embodiment of the present invention. One difference between the touch display 300 and the touch display 100 is that in the touch display 300, the first driving circuit 42 of the driving circuit module 40 is coupled to the signal receiving unit 30 and the display panel 50, for controlling the voltage difference between the pixel electrodes 56 and the common electrode 54 according to the image data D1 received by the signal receiving unit 30, to control the tilt angles of liquid crystal molecules of the liquid crystal layer 52 to change the grey levels of the pixels of the display panel 50, and the second driving circuit 44 is coupled to the signal receiving unit 30, the first electrodes 10a to 10g and the second electrodes 20a to 20g for receiving the image data D1' and for sequentially providing the driving pulses T6 to T0 for the second electrodes 20a to 20g. The second driving circuit 44 is also used to receive the sensing signal S1 through the first electrodes 10a to 10g, and to generate the touch signal S2 according to the sensing signal S1 and the image data D1.

Figure 1D:
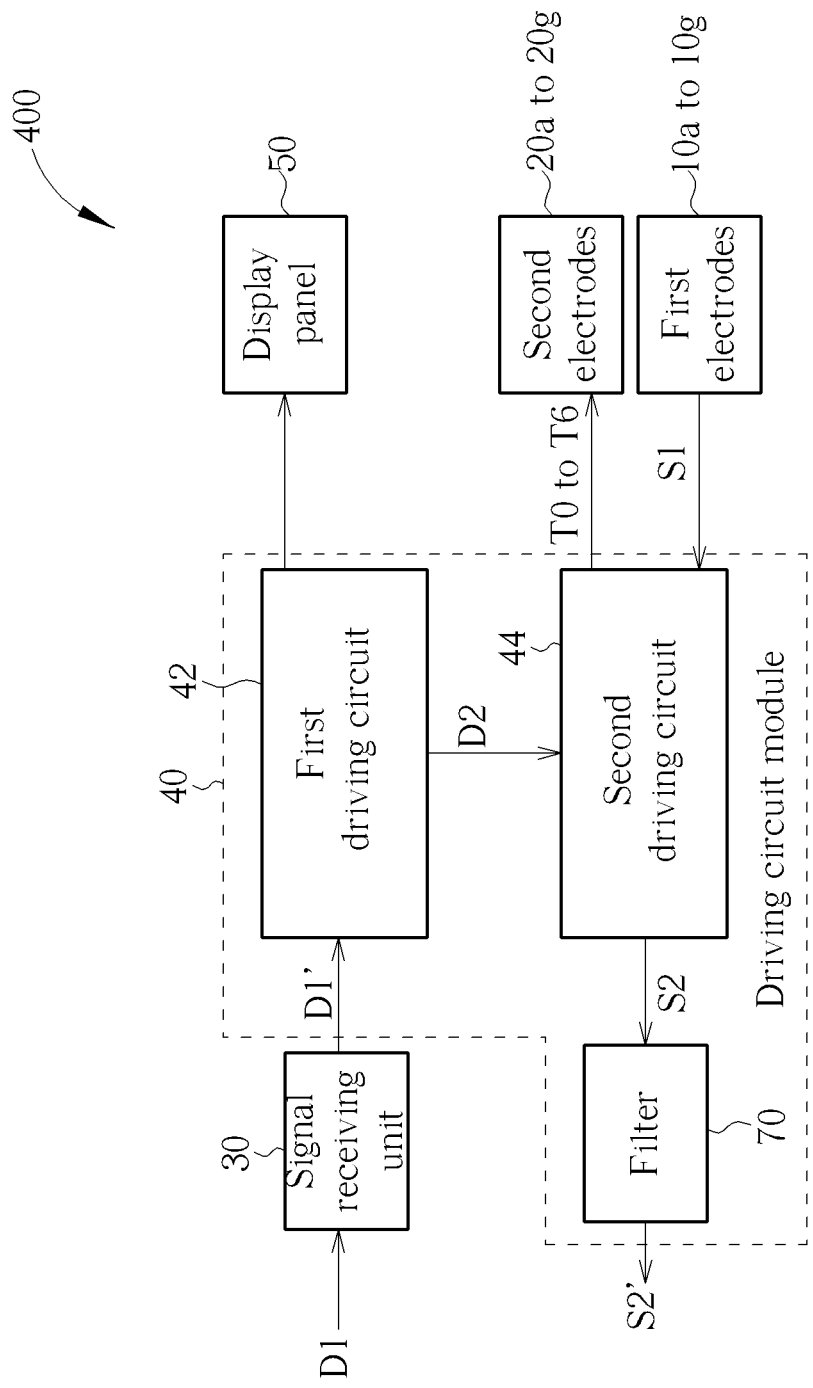
FIG. 1D shows the system structure of a touch display according to a fourth embodiment of the present invention.

Please refer to FIG. 1D, which shows the system structure of a touch display 400 according to a fourth embodiment of the present invention. One difference between the touch display 400 and the touch display 300 is that in the touch display 400, the second driving circuit 44 of the driving circuit module 40 is coupled to the first driving circuit 42, the first electrodes 10a to 10g and the second electrodes 20a to 20g, for receiving the adjusting signal D2 corresponding to the image data D1 from the first driving circuit 42. The adjusting signal is generated by the first driving circuit 42 according to the image data D1, and the adjusting signal D2 is used to provide the driving pulses T6 to T0, to receive the sensing signal S1 through the first electrodes 10a to 10g, and to generate the touch signal S2 according to the sensing signal S1 and the adjusting signal D2.

In the embodiments shown in FIGS. 1A to 1D, the first electrodes 10a to 10g and the second electrodes 20a to 20g of the touch displays 100 to 400 can be both configured at the same side of the liquid crystal layer 52, or respectfully configured at the opposite sides of the liquid crystal layer 52. For example, in FIG. 2, the z axis points upward and the −z axis points downward, and the first electrodes 10a to 10g and the second electrodes 20a to 20g can be both configured above the liquid crystal layer 52 or both configured below the liquid crystal layer 52. Besides, the second electrodes 20a to 20g can be configured below the liquid crystal layer 52 while the first electrodes 10a to 10g are configured above the liquid crystal layer 52, and vice versa. In other words, the present invention does not limit the positions of the first electrodes 10a to 10g and the second electrodes 20a to 20g, and any change or modification to the first electrodes 10a to 10g and the second electrodes 20a to 20g of the present invention should be included by the claimed scope of the present invention.

Figure 3:
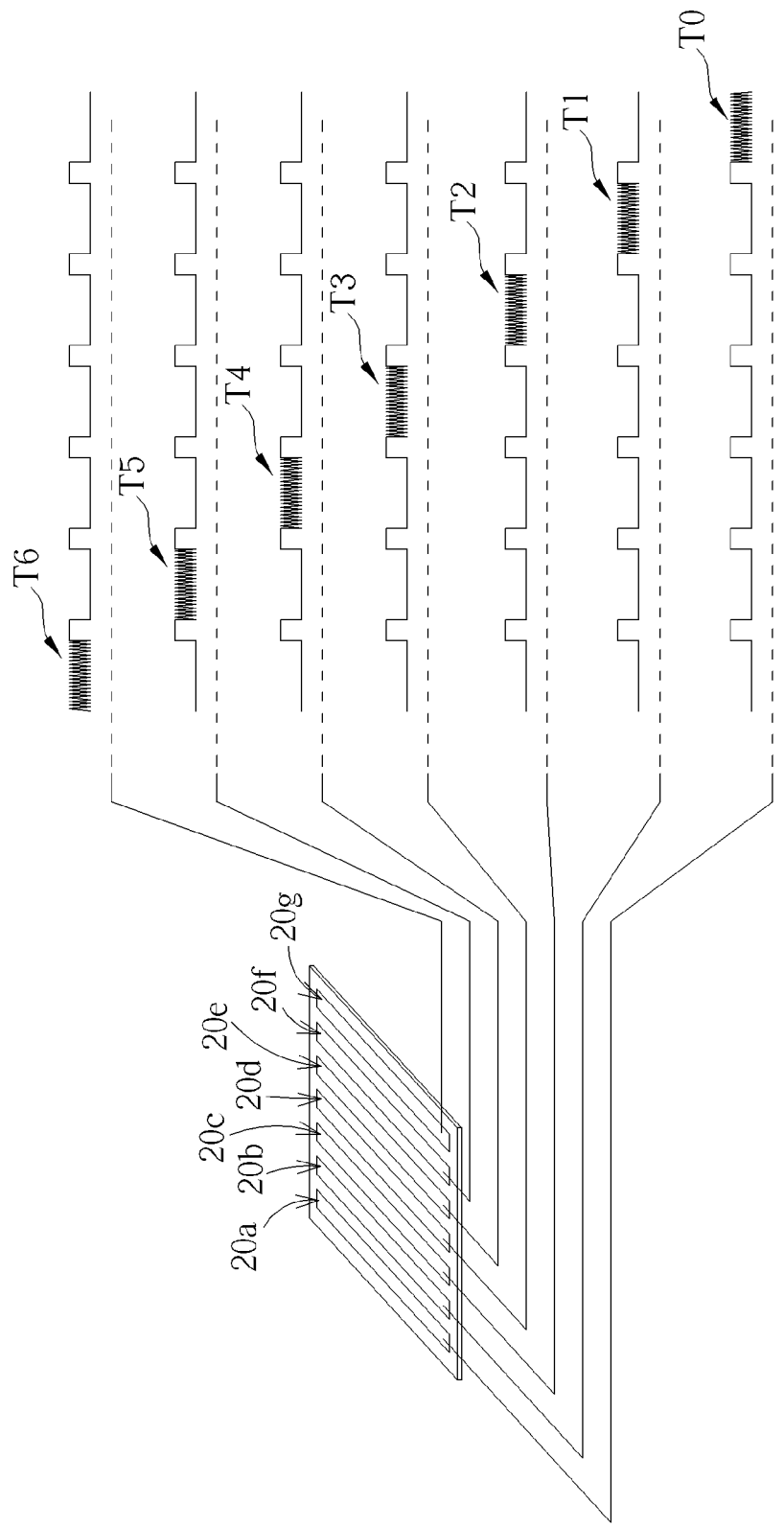
FIG. 3 shows the driving circuit module of the touch display outputting the driving pulses to the second electrodes.

Please refer to FIG. 3, which shows the driving circuit module 40 of the touch displays 100 to 400 outputting the driving pulses T0 to T6 to the second electrodes 20a to 20g. As shown in FIG. 3, the driving circuit module 40 outputs the driving pulses T6 to T0 to the second electrodes 20g to 20a, respectively, to individually drive the second electrodes 20g to 20a. The second electrodes 20g to 20a can receive the sensing signal S1 from the first electrodes 10a to 10g after the second electrodes 20g to 20a generate electromagnetic inductions generated according to the driving pulses T6 to T0 and a corresponding first electrode of the first electrodes 10a to 10g. The sensing signal S1 can be a sensing signal corresponded by the equivalent mutual capacitance between an electrode of the first electrodes 10a to 10g and a corresponding electrode of the second electrodes 20g to 20a. In brief, the sensing signal S1 can be used to determine the positions of the touch displays 100 to 400 being touched by users in the first to fourth embodiments.

Figure 4:
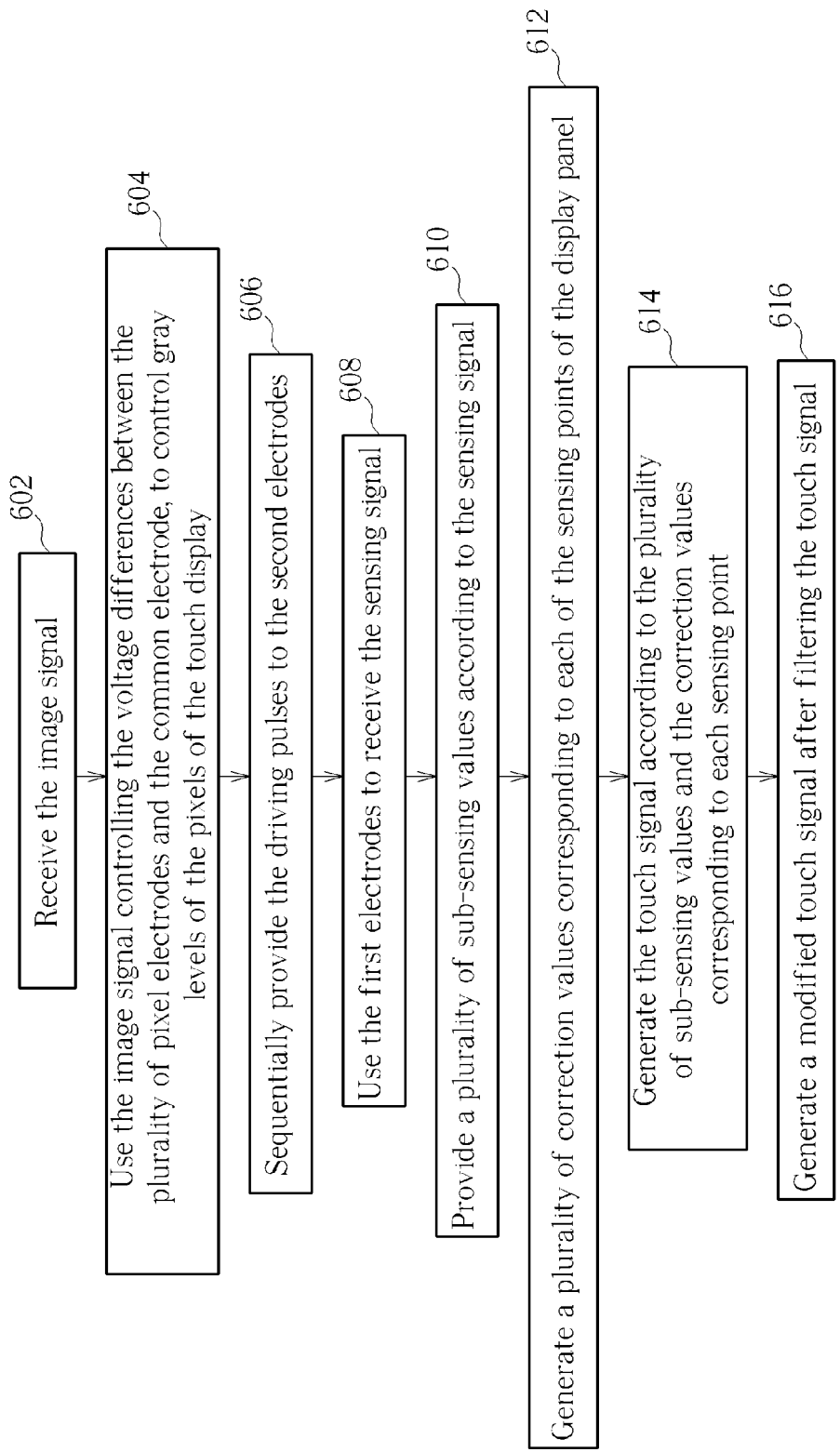
FIG. 4 is a flowchart showing the touch display generating the touch signal according to the first to fourth embodiments of the present invention.

Please refer to FIG. 4, which is a flowchart showing the touch displays 100-400 generating the touch signal S2 according to the first to fourth embodiments of the present invention. The descriptions are as follows.

Step 602: receive the image data D1;

Step 604: use the image data D1 controlling the voltage differences between the plurality of pixel electrodes 56 and the common electrode 54, to control gray levels of the pixels of the touch display 50;

Step 606: sequentially provide the driving pulses T6 to T0 to the second electrodes 20g to 20a;

Step 608: use the first electrodes to receive the sensing signal S1;

Step 610: provide a plurality of sub-sensing values according to the sensing signal D1;

Step 612: generate a plurality of correction values corresponding to each of the sensing points of the display panel 50;

Step 614: generate the touch signal S2 according to the plurality of sub-sensing values generated in step 610 and the correction values corresponding to each sensing point generated in step 612.

Step 616: generate a modified touch signal S2' after filtering the touch signal S2.

When sensing the touched positions of the touch displays 100 to 400, the image data D1 is received by signal receiving unit 30 in step 602, and then a light penetration order is generated through controlling the voltage differences between the pixel electrodes 56 and the common electrode 54 according to the image data D1. In step 606, the driving pulses T6 to T0 are sequentially provided to the second electrodes 20g to 20a in order to sequentially drive the second electrodes 20g to 20a. Some coupling effects or electrical inducting effects may occur between the second electrodes 20g to 20a and the first electrodes 10a to 10g and generate sensing signal S1, and the sensing signal S1 may vary if the first electrodes 10a to 10g sense touch inputs. Thus, in step 608, the sensing signal S1 may include multiple sensing signals of multiple sensing points formed by the first electrodes 10a to 10g and the second electrodes 20g to 20a, and the sensing signals corresponding to each of sensing points reflect whether the sensing points are being touched or not. In step 612, generating a plurality of correction values corresponding to each of the sensing points of the display panel 50 is generating a plurality of correction values corresponding to equivalent capacitances generated by the grey level of each of the sensing points of the display panel 50. Besides, the plurality of correction values can be generated according to gray levels of a portion of the pixels near the corresponding sensing point and the sensing signal. The aforementioned adjusting signal D2 can include correction values of each sensing point. In step 614, the touch signal S2 is generated according to the plurality of sub-sensing values generated in step 610 and the correction values corresponding to each sensing point generated in step 612.

For example, the touch signal S2 can be generated through calculating the difference between each sub-sensing value and the correction value corresponding to the sub-sensing value, and then generate a modified touch signal S2'. The filtering procedure is optional, and the touched positions of the touch displays 100 to 400 can be determined according to the touch signal S2 or the modified touch signal S2'. The sub-sensing values are sensing values generated through touching the plurality of sensing points formed by the first electrodes 10a to 10g and the second electrodes 20a to 20g, and each sensing point has a corresponding sub-sensing value. After performing the aforementioned steps in this embodiment, the equivalent capacitance caused due to images can be filtered, thus the touched positions of the touch displays 100 to 400 can be correctly detected without being affected by the grey levels of images.

Please refer to FIG. 5, which shows the touch displays 100 to 400 generating the touch signal S2 according to a plurality of sub-sensing values and correction values corresponding to each sensing point in step 614. As shown in FIG. 5, the sensed capacitances a(0,0) to a(4,3) respectively correspond to the capacitances generated on a first row, first column sensing point to a fifth row, fourth column sensing point on the display panel 50 through touching. The sensed capacitances can be generated or provided from the sensing signal S1, and the correction capacitances b(0,0) to b(4,3) respectively correspond to the capacitances generated on a first row, first column sensing point to a fifth row, fourth column sensing point on the display panel 50 according to the image data D1. The correction capacitances can also be generated by the second driving circuit 44 according to the image data D1, or be generated by the first driving circuit 42 according to the image data D1, that is, a new set of updated sensing capacitances c(0,0) to c(4,3) can be provided to generate the touch signal S2. The new set of updated sensing capacitances c(0, 0) to c(4,3) is generated through subtracting the correction capacitances b(0,0) to b(4,3) from the sensing capacitances a(0,0) to a(4,3). Although in the above illustrations about FIG. 5, sensing point matrices with five rows and four columns are provided, the number of sensing points or the resolution of the display panel 50 is not limited accordingly.

Figure 6:
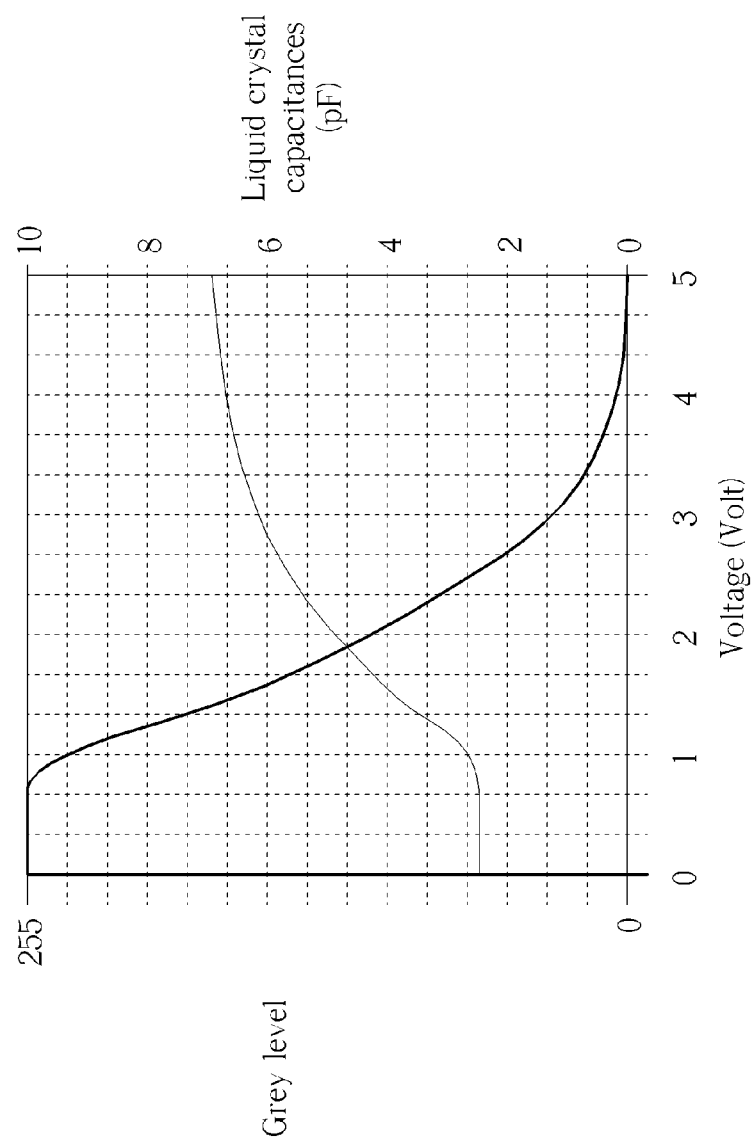
FIG. 6 shows the curve of the grey levels of the liquid crystal layer and the curves of liquid crystal capacitances corresponding to the liquid crystal layer of the touch displays of the present invention under various input voltages.

Please refer to FIG. 6, which shows the curve of the grey levels of the liquid crystal layer 52 and the curves of liquid crystal capacitances corresponding to the liquid crystal layer 52 of the touch displays 100 to 400 of the present invention under various input voltages. As shown in FIG. 6, the grey levels of the liquid crystal layer 52 inverts to the voltage values inputted to the liquid crystal layer 52. When the grey level of the liquid crystal layer 52 is 255, which is equivalent as 100% light penetration rate, the corresponding liquid crystal capacitances are 2.3 Pico Farad(pF). When the grey level of the liquid crystal layer 52 is 0, the corresponding liquid crystal capacitances are 7 pF. Thus, the liquid crystal capacitances can be determined through calculating the light penetration rate of each of the red, green, and blue (RGB) colored sub-pixels of the liquid crystal layer 52 corresponding to the image data D1 and the touch signal S2 can be generated.

Figure 7:
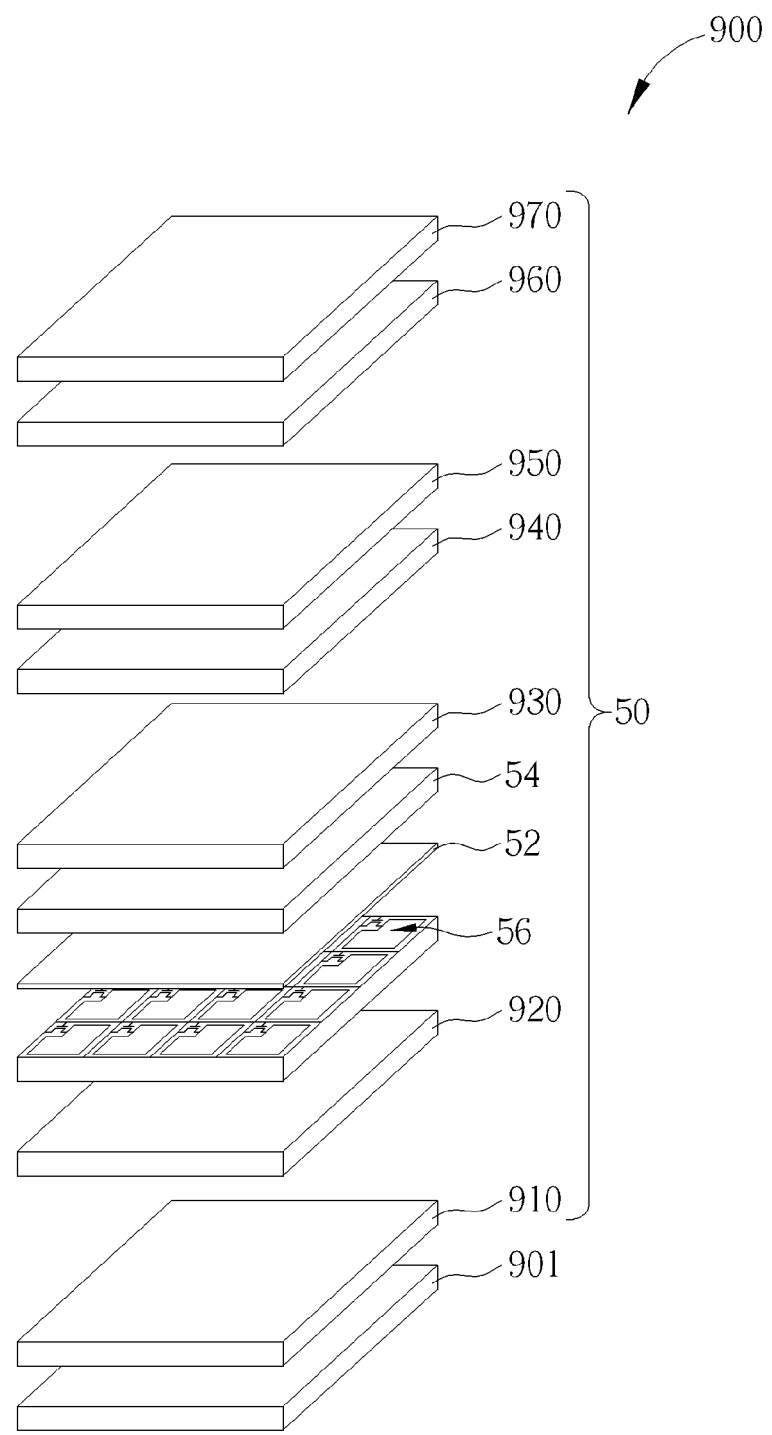
FIG. 7 shows the structure of the touch display according to the fifth embodiment of the present invention.

Please refer to FIG. 7, which shows the structure of the touch display 900 according to the fifth embodiment of the present invention. As shown in FIG. 7, the touch display 900 includes the display panel 50 and a backlight module 901. The backlight module 901 is used to generate backlight for the display panel 50. The display panel 50 is disposed at a side of the backlight module 901 and includes the liquid crystal layer 52, common electrode 54 and plurality of pixel electrodes 56 as illustrated above. The display panel 50 also includes a first polarization layer 910, a substrate 920, a color filter 930, a glass layer 940, a sensing electrode layer 950, a second polarization layer 960 and a protection layer 970. The first polarization layer, 910 is disposed at a side of the backlight module 901. The substrate 920 is disposed at a side of the first polarization layer 910 opposite to the backlight module 901, and has multiple thin film transistors. The thin film transistors and the pixel electrodes 56 are disposed on the surface of the substrate 920, and each thin film transistor is individually electrically coupled to one of the pixel electrodes 56. The color filter 930 is disposed at a side of the substrate 920 opposite to the liquid crystal layer 52, and the common electrode 54 is formed on a surface of the color filter 930 facing toward the liquid crystal layer 52. The glass layer 940 is disposed on a side of the color filter 930 opposite to the common electrode 54. The sensing electrode layer 950 includes the plurality of first electrodes 10a to 10g arranged along the x axis and the plurality of second electrodes 20a to 20g arranged along the y axis as illustrated above in the touch display 100. The second polarization layer 960 is disposed at a side of the sensing electrode layer 950 opposite to the glass layer 940, and the first electrodes 10a to 10g and the second electrodes 20a to 20g are configured between the glass layer 940 and the second polarization layer 960. The protection layer 970 is disposed on a side of the second polarization layer 960 opposite to the sensing electrode layer 950. In the fifth embodiment, the touch display 900 can be configured as in the first embodiment, e.g. externally connecting to elements as the signal receiving unit 30, driving circuit module 40 and filter 70, or combined into other elements to be used in various applications.

Figure 8:
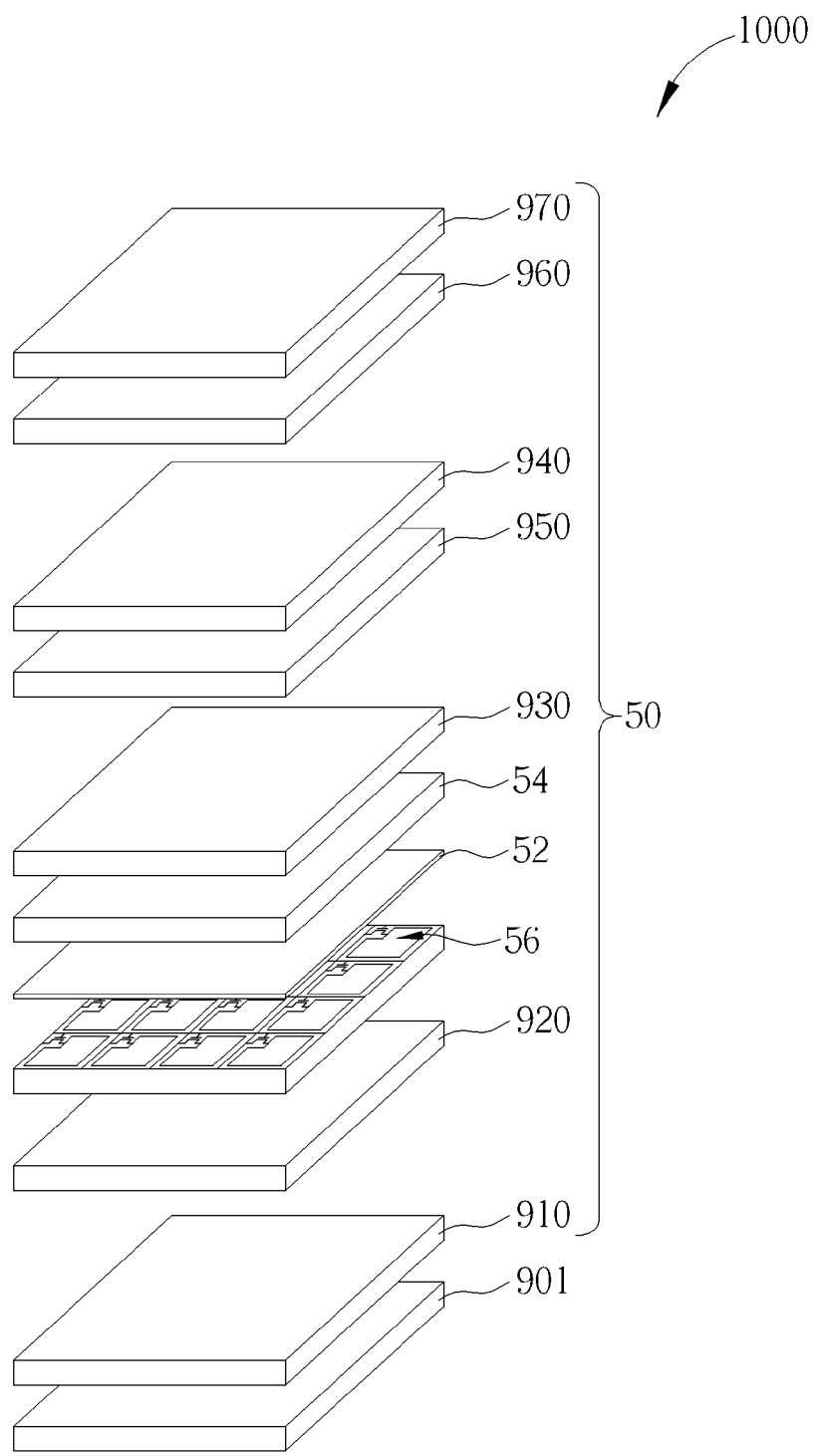
FIG. 8 shows the structure of the touch display according to the sixth embodiment of the present invention.

Please refer to FIG. 8, which shows the structure of the touch display 1000 according to the sixth embodiment of the present invention. As shown in FIG. 8, one difference between the touch displays 900 and 1000 is that in the touch display 1000, the sensing electrode layer 950 is disposed between the color filter layer 930 and the glass layer 940. Similarly, in the sixth embodiment, the touch display 900 can be configured as in the first embodiment, e.g. externally connecting to elements as the signal receiving unit 30, driving circuit module 40 and filter 70, or combined into other elements to be used in various applications.

Figure 9:
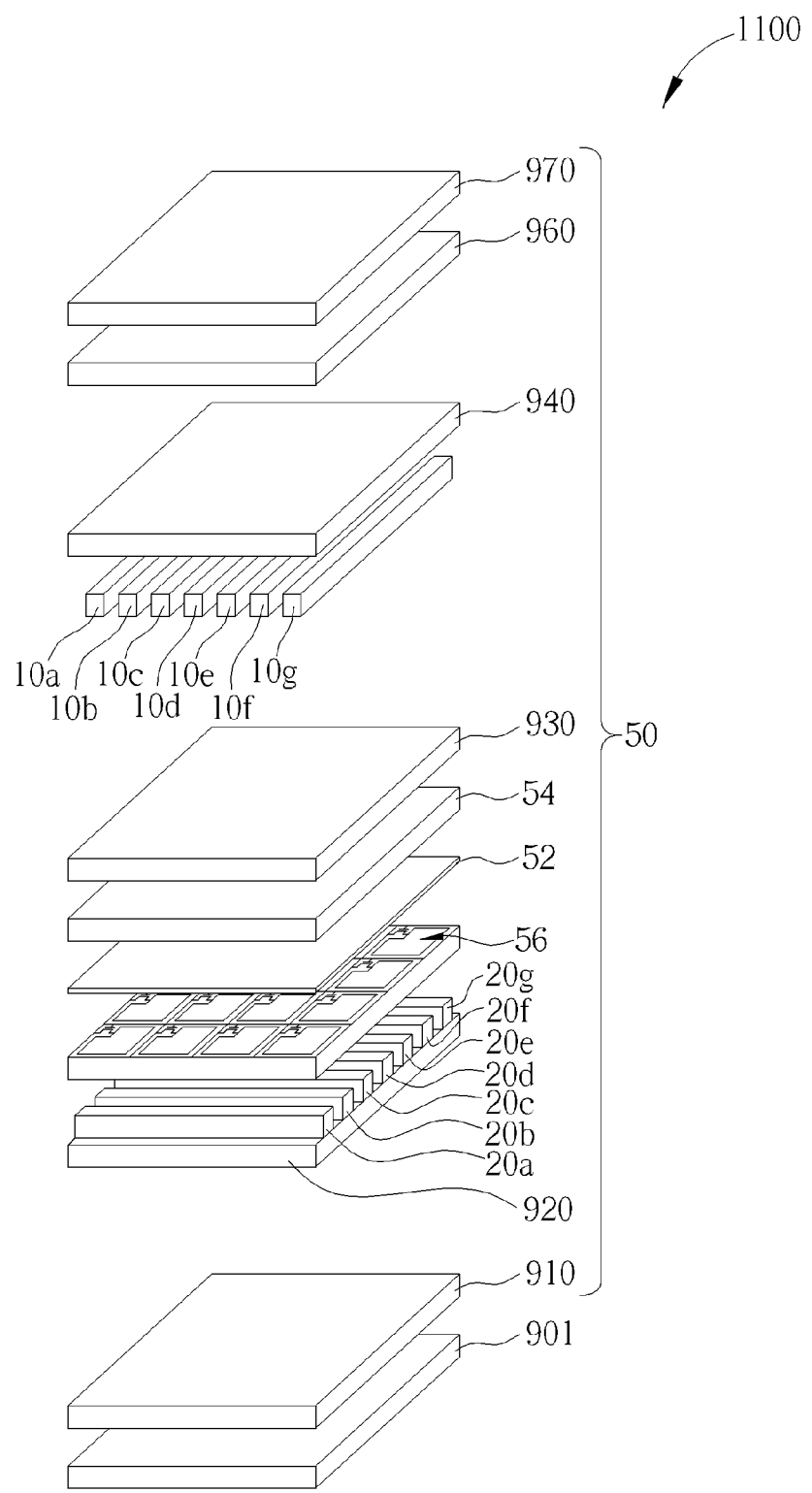
FIG. 9 shows the structure of the touch display according to the seventh embodiment of the present invention.

Please refer to FIG. 9, which shows the structure of the touch display 1100 according to the seventh embodiment of the present invention. As shown in FIG. 9, the difference between the touch display 1100 and 100 is that in the touch display 1100, the first electrodes 10a to 10g and the second electrodes 20a to 20g are respectively disposed at the opposite sides of the common electrode 54, the liquid crystal layer 52 and the pixel electrodes 56. Besides, the touch displays 100 to 400 in FIGS. 1A to 1D can also have similar or the same structures as the embodiments in FIGS. 7 to 9.

Figure 10A:
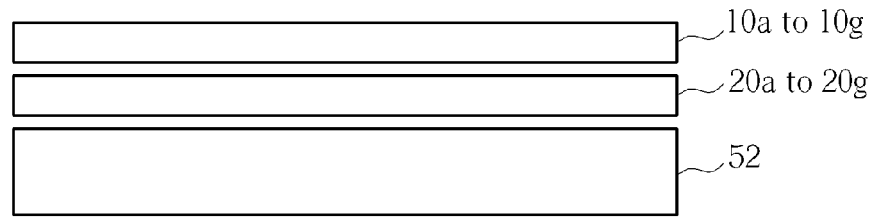
FIG. 10A shows the first electrodes and the second electrodes of the embodiments of the present invention being disposed at the same side of the liquid crystal layer.
Figure 10B:
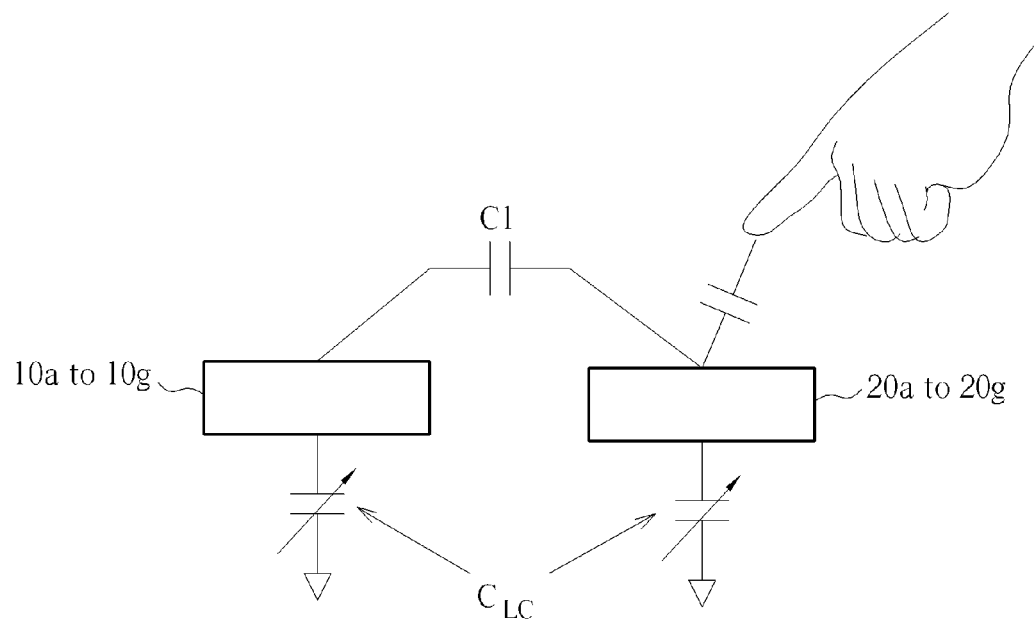
FIG. 10B shows the structure in FIG. 10A being touched by a finger.
Figure 11A:
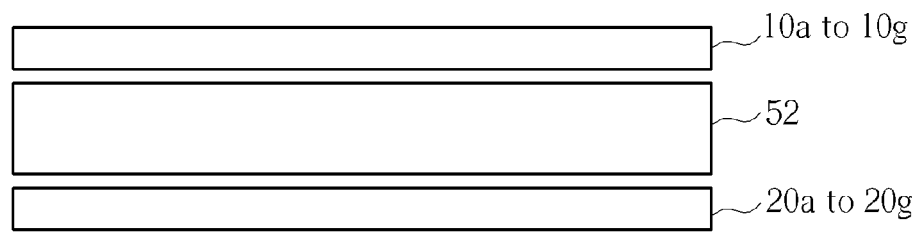
FIG. 11A shows the first electrodes and the second electrodes of the embodiments of the present invention being disposed at the opposite sides of the liquid crystal layer.
Figure 11B:
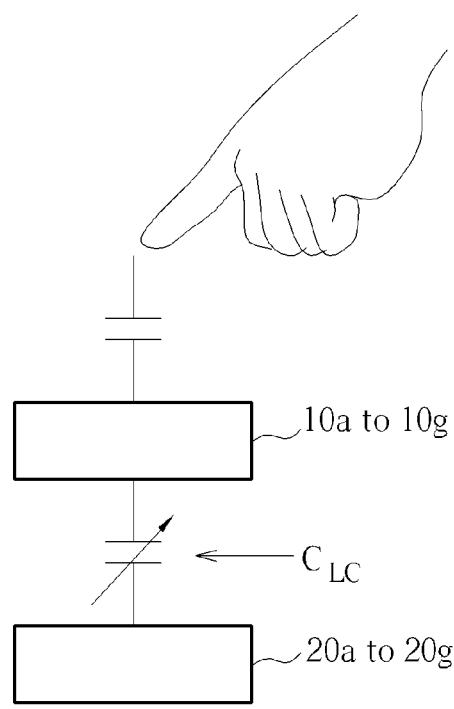
FIG. 11B shows the structure in FIG. 11A being touched by a finger.

Please refer to FIGS. 10A to 11B. FIG. 10A shows the first electrodes 10a to 10g and the second electrodes 20a to 20g of the embodiments of the present invention being disposed at the same side of the liquid crystal layer, FIG. 10B shows the structure in FIG. 10A being touched by a finger, FIG. 11A shows the first electrodes 10a to 10g and the second electrodes 20a to 20g of the embodiments of the present invention being disposed at the opposite sides of the liquid crystal layer, and FIG. 11B shows the structure in FIG. 11A being touched by a finger. As shown in FIG. 10B, when the first electrodes 10a to 10g and the second electrodes 20a to 20g are disposed on the same side of the liquid crystal layer 52 and are touched by the finger, the sensing capacitance C1 will be generated between the corresponding electrodes of the first electrodes 10a to 10g and the second electrodes 20a to 20g, and the liquid crystal capacitance $C_{LC}$ will be generated between the first electrodes 10a to 10g and the liquid crystal layer 52, and between the second electrodes 20a to 20g and the liquid crystal layer 52. As shown in FIG. 11B, when the first electrodes 10a to 10g and the second electrodes 20a to 20g are disposed on the opposite sides of the liquid crystal layer 52 and are touched by the finger, the liquid crystal capacitance $C_{LC}$ will be generated between the first electrodes 10a to 10g and the second electrodes 20a to 20g. It can be seen from the FIGS. 10B and 11B that in the embodiments of the present invention, whether the first electrodes 10a to 10g and the second electrodes 20a to 20g are disposed at the same side or opposite sides of the liquid crystal layer 52, the touch display can perform the capacitive touch function.

In view of above, through utilizing the devices and methods provided in the embodiments of the present invention, the touch displays 100 to 400 and 900 to 1100 will not misjudge the positions touched by users due to the equivalent capacitance caused by the image data D1, thus improving the accuracy and fluency of operating the touch displays 100 to 400 and 900 to 1100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display comprising:
    a display panel including a plurality of pixels;
    a plurality of sensing electrodes stacked with the display panel for detecting a touch input and generating a sensing signal in response to the touch input; and
    a driving circuit module electrically coupled to the display panel and the plurality of sensing electrodes, for controlling the pixels of the display panel according to an image data, and generating a touch signal for indicating whether the touch display is touched or not by calculating based on a value of the sensing signal and the image data.

2. The touch display of claim 1, wherein the display panel comprises:
    a liquid crystal layer, a common electrode and a plurality of pixel electrodes, the common electrode and the plurality of pixel electrodes being configured to control the liquid crystal layer;
the plurality of sensing electrodes comprising:
    a plurality of first electrodes arranged along a first axis for outputting the sensing signal; and
    a plurality of second electrodes arranged along a second axis for receiving plural sets of driving pulses sequentially;
the touch display further comprising a signal receiving unit for receiving the image data; and
the driving circuit module further electrically coupling to the signal receiving unit, the first electrodes and the second electrodes, and being further configured to provide the second electrodes with the plural sets of driving pulses sequentially and receive the sensing signal from the first electrodes.

3. The touch display of claim 2, wherein the driving circuit module comprises:
    a first driving circuit coupled to the display panel, the signal receiving unit and the second electrodes, for controlling voltage differences between each pixel electrode and the common electrode according to the image data so as to control grey levels of the pixels, and to sequentially provide the plural sets of driving pulses for the second electrodes; and
    a second driving circuit coupled to the signal receiving unit and the first electrodes, for receiving the sensing signal from the first electrodes, receiving the image data from the signal receiving unit, and generating the touch signal according to the sensing signal and the image data.

4. The touch display of claim 2, wherein the driving circuit module comprises:
    a first driving circuit coupled to the display panel, the signal receiving unit and the second electrodes, for controlling voltage differences between each pixel electrode and the common electrode according to the image data so as to control grey levels of the pixels, and to sequentially provide the plural sets of driving pulses for the second electrodes; and
    a second driving circuit coupled to the signal receiving unit and the first electrodes, for receiving the sensing signal from the first electrodes, receiving an adjusting signal corresponding to the image data with the first driving circuit, and generating the touch signal according to the sensing signal and the adjusting signal.

5. The touch display of claim 2, wherein the driving circuit module comprises:
    a first driving circuit coupled to the signal receiving unit, for controlling voltage differences between each pixel electrode and the common electrode according to the image data received by the signal receiving unit so as to control grey levels of the pixels; and
    a second driving circuit coupled to the signal receiving unit, the first electrodes and the second electrodes, for receiving the image data, providing the plural sets of driving pulses for the second electrodes, receiving the sensing signal with the first electrode, and generating the touch signal according to the sensing signal and the image data.

6. The touch display of claim 2, wherein the driving circuit module comprises:
    a first driving circuit coupled to the signal receiving unit, for controlling voltage differences between each pixel electrode and the common electrode according to the image data received by the signal receiving unit so as to control grey levels of the pixels; and
    a second driving circuit coupled to the signal receiving unit, the first electrodes and the second electrodes, for receiving an adjustment signal corresponding to the image data from the first driving circuit, providing the plural sets of driving pulses for the second electrodes, receiving the sensing signal from the first electrodes, and generating the touch signal according to the sensing signal and the adjustment signal.

7. The touch display of claim 2, wherein the first electrodes and the second electrodes are configured at a same side of the liquid crystal layer.

8. The touch display of claim 2, wherein the first electrodes and the second electrodes are set at different sides of the liquid crystal layer.

9. The touch display of claim 2, wherein the driving circuit module further comprises a filter for filtering the touch signal to generate a modified touch signal.

10. The touch display of claim 2, wherein the driving circuit module further comprises a filter for filtering the touch signal to generate a modified touch signal.

11. The touch display of claim 2, wherein:
the touch display further comprises a backlight module for generating backlight for the display panel;
the display panel is disposed at a side of the backlight module and the display panel comprises:
  a first polarization layer, disposed at a side of the backlight module;
  a substrate, disposed at a side of the first polarization layer opposite to the backlight module, having multiple thin film transistors, wherein the thin film transistors and the pixel electrodes are disposed on the surface of the substrate, and each thin film transistor is individually electrically coupled to one of the pixel electrodes;
  a color filter, disposed at a side of the substrate opposite to the liquid crystal layer, wherein the common electrode are formed on a surface of the color filter facing toward the liquid crystal layer;
  a glass layer, disposed on a side of the color filter opposite to the common electrode;
  a sensing electrode layer comprising the plurality of first electrodes arranged along the first axis and the plurality of second electrodes arranged along the second axis;
  a second polarization layer is disposed at a side of the sensing electrode layer opposite to the glass layer;
  a protection layer, disposed on a side of the second polarization layer opposite to the sensing electrode layer.

12. The touch display of claim 11, wherein the sensing electrode layer is disposed between the glass layer and the second polarization layer.

13. The touch display of claim 11, wherein the sensing electrode layer is disposed between the color filter layer and the glass layer.

14. The touch display of claim 1, wherein the touch signal comprises a plurality of sub-touch signals, each sub-touch signal is for indicating a touch status of a corresponding sensing point at the display panel in response to the touch input, and each sub-touch signal is generated according to gray levels of a portion of the pixels near the corresponding sensing point and the sensing signal.

15. A touch display comprising:
a display panel including a plurality of pixels;
a plurality of sensing electrodes stacked with the display panel for detecting a touch input and generating a sensing signal in response to the touch input; and
a driving circuit module electrically coupled to the display panel and the plurality of sensing electrodes, for controlling the pixels of the display panel, and generating a touch signal for indicating whether the touch display is touched or not by calculating based on capacitances of a liquid crystal layer of a portion or all of the pixels and a value of the sensing signal.

16. A method for driving a touch display, the touch display comprising a display panel, a plurality of first electrodes and a plurality of second electrodes, the display panel comprising a plurality of pixels, the method comprising:
receiving an image data;
controlling gray levels of the pixels of the touch display according to the image data;
receiving a sensing signal in response a touch input from the first electrodes; and
generating a touch signal for indicating whether the touch display is touched or not by calculating based on a value of the sensing signal and the image data.

17. The method of claim 16, wherein:
the display panel further comprises a liquid crystal layer, a common electrode and a plurality of pixel electrodes, and the common electrode and the pixel electrodes are configured to control the liquid crystal layer; and
controlling the gray levels of the pixels of the touch display according to the image data comprises controlling voltage differences between each pixel electrode and the common electrode according to the image data.

18. The method of claim 16, wherein:
the touch display comprises a liquid crystal layer and a plurality of pixel electrodes, and the second electrodes are further used with the pixel electrodes to control the liquid crystal layer; and
controlling the gray levels of the pixels of the touch display according to the image data comprises controlling voltage differences between each pixel electrode and the second electrodes according to the image data.

19. The method of claim 16, wherein generating the touch signal according to the sensing signal and the image data comprises:
providing a plurality of sub-sensing values according to the sensing signal, wherein the sub-sensing values correspond to a plurality of sensing points is generated by the first electrodes and the second electrodes;
generating a plurality of correction values corresponding to each of the sensing points, wherein each of the correction values is generated according to the image data of at least one pixel corresponding to the sensing point; and
generating the touch signal according to the sub-sensing values and the correction values.

20. The method of claim 16, wherein generating the touch signal according to the sensing signal and the image data comprises calculating subtraction values between the sub-sensing values and the correction values corresponding to the sub-sensing values to generate the touch signal.

* * * * *